(12) United States Patent
Noonan

(10) Patent No.: US 6,870,985 B2
(45) Date of Patent: Mar. 22, 2005

(54) OPTICAL CROSS-CONNECT SWITCH

(75) Inventor: William A. Noonan, Bethesda, MD (US)

(73) Assignee: Corporation for National Research Initiatives, Reston, VA (US)

( * ) Notice: Subject to any disclaimer, the term of this patent is extended or adjusted under 35 U.S.C. 154(b) by 112 days.

(21) Appl. No.: 10/419,263

(22) Filed: Apr. 21, 2003

(65) Prior Publication Data

US 2004/0005113 A1 Jan. 8, 2004

Related U.S. Application Data

(60) Provisional application No. 60/373,621, filed on Apr. 19, 2002.

(51) Int. Cl.[7] .................................................. G02B 6/26
(52) U.S. Cl. .......................................... 385/17; 385/16
(58) Field of Search ............................. 385/15, 16, 17, 385/18

(56) References Cited

U.S. PATENT DOCUMENTS 5,315,428 A * 5/1994 Peng .......................... 359/216

6,421,477 B1 * 7/2002 Hane et al. .................... 385/21

OTHER PUBLICATIONS

U.S. provisional application No. 60/373,621.*

* cited by examiner

Primary Examiner—Akm Enayet Ullah
Assistant Examiner—Jennifer Doan
(74) Attorney, Agent, or Firm—Nixon & Vanderhye P.C.

(57) ABSTRACT

An optical cross-connect switch is disclosed which includes a plurality of optical input fibers, a plurality of optical output fibers and a plurality of the (1×N)-switches ganged together. Each of the switches includes a state selector, a lens for collimating light from a single one of the optical input fibers, a plurality of output coupling lenses, each of which corresponds to one of the optical output fibers, and a beam shaper for focusing light from the state selector onto a selected one of the coupling lenses for further focusing of the light onto the corresponding optical output fiber. Alternatively, the optical cross-connect switch can be a single an (L×K)-switch which includes a plurality of state selectors and a plurality of lenses for collimating light from the plurality of optical input fibers.

56 Claims, 13 Drawing Sheets

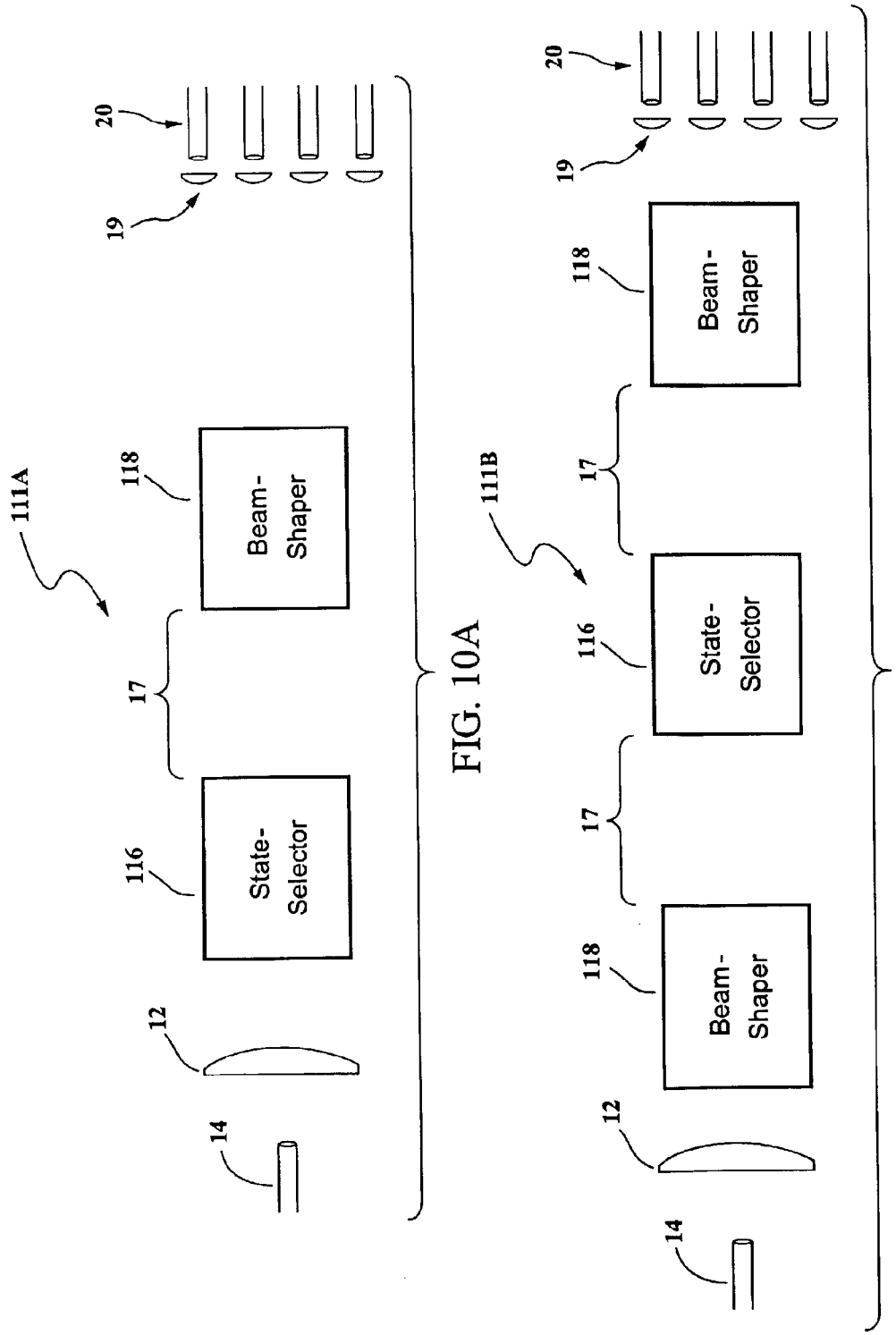

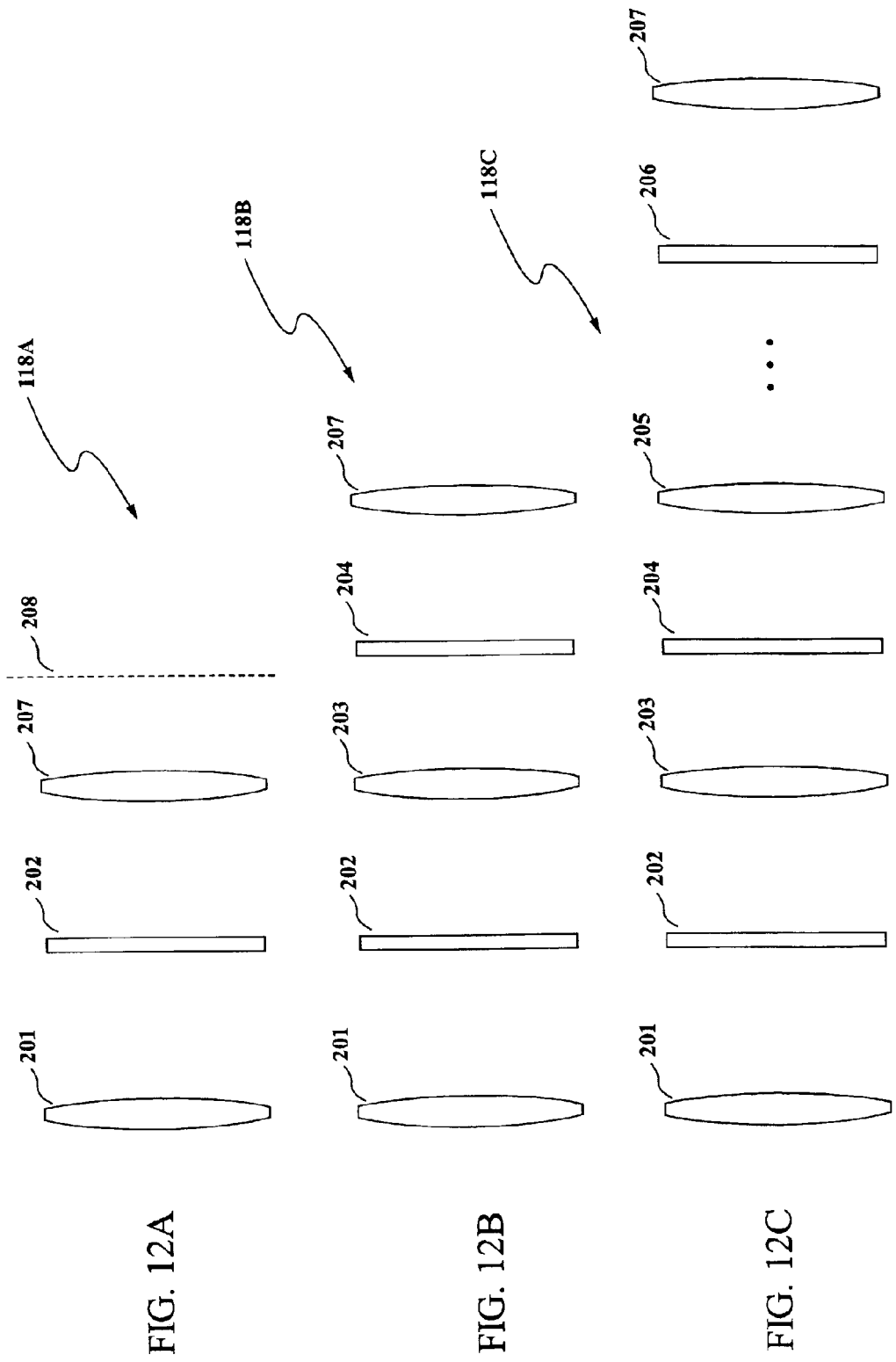

OPTICAL CROSS-CONNECT SWITCH

This application claims the benefit of Provisional Application No. 60/373,621, filed Apr. 19, 2002, the entire contents of which is hereby incorporated by reference in this application.

FIELD OF THE INVENTION

The present invention relates generally to optical beam-steering, spatial light modulation, diffractive optics and computer-generated holography, and more particularly to all-optical cross-connect switches which may be used in, inter alia, optical communication systems.

BACKGROUND OF THE INVENTION

Currently MEMS is the leading technology for implementing all-optical cross-connect switches for fiber optic telecommunication networks. Typically these devices work by collimating light from an array of input fibers and reflecting these light beams off an array of movable micromirrors, which then act to deflect each beam toward the appropriate output fiber. For large switches (more than 100 input and output fibers) the most popular configuration has the micromirrors arranged on a rectangular grid with their faces parallel to the substrate. The input light beams are directed at the micromirror array in the normal direction, and the mirrors tilt on two axes to deflect each input beam in the desired direction. Very often the deflected light beams are retro-reflected by an ordinary bulk mirror back onto other micromirrors in the array. These mirrors are then tilted so as to direct the light beams onto the appropriate fibers in the original fiber array. This way, any fiber can be cross connected to any other fiber in the array without having to partition the fibers into input and output groups and restricting cross-connections to between these groups only.

This so-called "3D MEMS" configuration has several drawbacks:

(1) Switching Speed: The mirrors are 100's of microns in diameter and fairly thick (to prevent warping). Their large size and mass give them a large moment of inertia, which limits their tilting speed to about 10 ms. Moreover this problem becomes exacerbated as the number ports in the switch increases, because this implies a smaller angular separation between ports. In turn, this means that beam spreading due to Gaussian optics and diffraction must be reduced, and only increasing the mirror diameters can do that.

(2) Control: Using a $1024 \times 10^{24}$ switch as an example, a switch this size would have a 32×32 fiber array, and therefore the mirror tilt would have to be controlled to a precision considerably greater than $\frac{1}{32}$ of full deflection. This requirement only becomes more stringent as the switch size increases.

(3) Fabrication: A large mirror diameter requires that the mirrors be suspended high above the substrate so that there is sufficient clearance for the mirror to tilt to its maximum deflection (typically about 10°). These kinds of structures are difficult to fabricate with currently well-established micromachining techniques. Often, designs resort to pop-up structures that are fabricated with thin, surface micromachined structures that fold up into their final configuration. However this approach significantly complicates the device. Furthermore, making large diameter mirrors that are stiff and optically flat is difficult.

(4) Actuation: Arrays of tilt-mirrors are typically actuated electrostatically. However this type of actuation has a possible collapse instability ("snap-down"), which arises because the electrostatic force varies as the inverse square of the electrode separation, whereas the mechanical restoring force typically increases only linearly. To avoid this instability, the minimum electrode separation must be at least ⅓ of the initial gap between electrode and mirror. In turn, this means that the already large clearances required by large diameter mirrors must be three times larger still. Furthermore, the mirror's large moment of inertia will require large electrostatic and restoring forces, if it is to have reasonable switching times. In turn, this means that large driving voltages (~100V) are needed.

The conception of tilt-mirror optical switches is based on geometric optics, i.e., light rays from the input fiber are reflected to the desired output fiber, and the appropriate tilt angle for the micromirror are calculated from the geometric optics law "the angle of incidence equals the angle of reflection." Alternatively, designs can be based on the more general theory of wave optics, where light is understood to be an electromagnetic wave rather than a geometric ray. In this picture, an optical switch element alters the amplitude and/or phase profile of the incoming wavefront so that the light wave then propagates toward the desired output fiber. In the case of the tilt-mirror switch, the tilted mirror induces in the wavefront a phase delay that varies linearly across the face of the mirror, and it is this linearly tapered phase profile that is responsible for redirecting the light wave propagation.

Instead of a continuous linear taper, one might look for a different phase profile that would steer the outgoing light beam. One example is the variable-blaze diffraction grating. On the other hand, the most obvious possibility is to simply replace the continuous linear phase profile of the tilt-mirror with a staircase approximation, which is the principle on which phased array antennas work. A tiling of small mirrors that move up and down in a piston-like fashion can generate such a staircase phase profile. This array is essentially a replacement for a single tilt-mirror, so an N×N switch would thus consists of 2N copies of this array, two for each input beam. This approach has several advantages over tilt-mirrors:

(1) Switching Speed: The much smaller diameter of these mirrors reduces their masses in two ways. First, the area of each mirror is much smaller. Second, the smaller mirror does not need to be as thick to maintain optical flatness. This drastic reduction in mass means that the mirror can be switched much faster—in about 10 $\mu$s.

(2) Control: Although these mirrors have about the same number of positions as the tilt-mirrors (16 vertical positions vs. 32 tilt-angles along a given axis), the precision with which these positions need to be controlled is much less. This scheme is more tolerant to positioning errors.

(3) Reliability: The performance of this device will degrade gradually if individual mirror elements fail. In contrast, almost any failure mode of the tilt-mirror will have a catastrophic impact on its performance.

(4) Fabrication: The vertical displacement of the mirrors will not need to exceed ½λ, which is 780 nm for the fiber optic communications C-band. Therefore the required clearances are much smaller, and the mirror structures can be fabricated using straightforward surface micromachining techniques.

(5) Actuation: These small clearances also allow smaller driving voltages.

Despite these advantages, the phased array approach has one very large drawback, i.e., the huge number of mirrors that must be fabricated. Because of diffraction, the reflected beam has a small spreading angle. This limits the number of non-overlapping steering angles, and this number is a function of the number mirrors in the array. A micromirror array producing a 32×32 grid of distinct steering angles will need to have at least 100×100 elements. Therefore a 1000×1000 OXC switch based on 100×100 micromirror arrays will have 20 million mirrors. Even so, an array this size will have a diffraction efficiency of only about 80%, and a 99% efficient array would need to be at least 512×512 elements.

Not only does this many mirrors need to be fabricated with good yield, but the control circuitry must also be duplicated 20 million times as well. Even merely addressing and running control lines to this many mirrors is a formidable challenge.

SUMMARY OF THE INVENTION

It is therefore an object of the present invention to reduce the size and complexity of the mirror arrays needed by free-space all-optical cross-connect switches to render these switches more practical and manufacturable.

It is another object of the present invention to reduce the complexity of the electronic control system for the switch.

It is a further object of the present invention to allow for the substitution of the micromirror array by other types of spatial light modulators to render faster switching speeds or less expensive to manufacture.

It is yet another object of the present invention to allow channel splitting, wherein the light signals from a single input optical fiber is split and directed to several output optical fibers.

It is yet a further object of the present invention to allow channel merging, wherein the light from several input optical fibers are directed to the same output optical fiber.

It is still a further object of the present invention to enable a considerably more manufacturable optical cross-connect switch than previous designs.

These objectives are realized in the present invention by using a novel and very flexible architecture for an optical cross-connect switch that allows the use of almost any spatial light modulator (SLM) within the optical cross-connect switch to effect the switching action. The SLM can be very rudimentary, i.e., and all that is necessary is that it have relatively few segments and be capable of generating phase-shifts of 0 and $\pi$. The utility the cross-connect switch of the present invention is that it is easier to realize an inexpensive, easily manufacturable or fast SLM that has few segments and only generates two levels of phase-shifts. Since the dynamic (switching) element of any optical cross-connect switch is the most expensive and most difficult to manufacture element, this advantage has a large impact on the utility of the switch.

For example, if a micromirror array were to be used for the SLM, then the fact that only phase-shifts of 0 and $\pi$ are required means that each micromirror needs to move to two different positions. In turn, these two displacements can be set using mechanical stops, obviating the need for closed-loop electronic control. Moreover, a micromirror array of fewer mirrors can be fabricated with higher yields.

The present invention results from the realization that the micro-mirror array in the optical cross-connect switches described in "Background of the Invention" are required to perform two functions simultaneously: (1) state selection where a re-configuration of the mirror array changes which output fiber is selected to receive the light from a given input fiber, and (2) beam shaping in which the light is focused onto the selected output fiber to maximize output-coupling and minimize cross-coupling with other fibers. On one hand, the micromirror array needs to be dynamic to perform state selection. On the other hand, the need for good focusing (or collimation) of the output beam is the reason why so many mirrors are needed in a phased array and why tilt-mirrors need to be so wide. In the optical switch of the present invention, these two functions are separated. The micromirror array is responsible only for state selection without regard to either collimation or even steering of the reflected light; all that is important is that the array can produce a distinct, linearly independent phase profile for each output state (i.e., selected output fiber). A fixed optical subsystem is then added whose sole function is beam shaping. This beam shaper transforms each phase profile reflected by the mirror array into a wave-amplitude profile that converges onto the appropriate output fiber.

In this scenario, the mirror array acts as a phase-only spatial light modulator (SLM). Therefore, the mirror array can be substituted with an SLM implemented in another technology, e.g. an electro-optic or a liquid crystal.

An (L×K)-switch according to the present invention can be built up by ganging L (1×K) switch elements in parallel using fiber optic couplers to connect output fibers. One embodiment of a (1×K)-switch element according to the present invention consists of a lens that collimates light from a single input optical fiber so that a plane wave is incident on a spatial light modulator (SLM), such as a micromirror array. The SLM is set to imposes any one of K different complex wave-amplitude (or "wavefront") profiles on the wave. The wave-amplitude profiles can be very irregular because subsequent beam shaping optics transforms the wave into one that focuses on to a desired one of a plurality of output optical fibers. Depending on which profile the incident wave-amplitude has, the beam shaper focuses the light onto a different output fiber Employing beam shaping optics allows great flexibility in choosing the K wavefront profiles for the K switch states. Since it is irrelevant as to what these profiles look like, as long as they are distinct, it is possible to choose a very simple, easy to manufacture and/or fast design for the SLM. There is also a constraint on the wavefront profiles required from the SLM, i.e., it must be linearly independent. In any optical system composed of linear elements, including a beam shaper, the complex amplitudes for the incoming and outgoing waves are related by the integral operator:

$$v(x, y) = \int\int G(x, y \mid x', y')u(x', y')dx'dy' \equiv \hat{G}u(x, y) \tag{1}$$

where $v$ is the complex amplitude of the outgoing wave evaluated at the exit plane, and u is the complex amplitude of the incoming wave evaluated at the entrance plane. Considering three different wavefronts produced by the state-selecting SLM, $u_i(x,y)$, i=1,2,3, and the corresponding output wavefronts $v$, $(x,y)=\hat{G}u_i(x,y)$, and assuming that the output waves with amplitude profiles $v_1$ and $v_2$ converge on fibers #1 and #2 as desired, and that $u_3$ is not linearly independent of $u_1$ and $u_2$, then $u_3=c_1u_1+c_2u_2$. But since the integral operator is linear, it can be deduced that $$v_3=\hat{G}u_3=\hat{G}(c_1u_1+c_2u_2)=c_1\hat{G}u_1+c_2\hat{G}u_2=c_1v_1+c_2v_2 \tag{2}$$

Therefore, portions of the light from output $v_3$ converge on both fibers #1 and #2. Thus to avoid this, all the input wavefront profiles, $u_i(x,y)$, must be linearly independent.

One useful side-effect is the ability to broadcast an input signal to more than one output. For instance, if one SLM configuration focuses light on output fiber A and another configuration focuses light on fiber B, then a linear combination of these two configurations will focus light on both A and B simultaneously. Each state n of the SLM produces a different complex wave-amplitude, $u_n(x,y)$, at its output. The beam shaper needs to transform each $u_n$ to a complex amplitude $v_n$ that will produce focusing on output fiber n. In other words, $$v_n(x,y)=\hat{G}u_n(x,y) \; n=1,2\ldots N \qquad (3)$$

Thus, the beam shaper needs to have an amplitude transfer function $G(x,y|x',y')$ that satisfies equations (1) and (3). All such transfer functions are too complex to be realized by using traditional optics. However, the inclusion of diffractive optical elements (DOEs) provides enough flexibility that (1) and (3) can be satisfied for appropriately chosen $v_n$.

The simplicity of the SLM used in the present invention is offset by the complexity of the beam shaper in the present invention, but the fact that this system element is fixed greatly simplifies its manufacture.

BRIEF DESCRIPTION OF DRAWINGS

FIGS. 10A and 10B show major functional units of a (1×K)-switch element, i.e., contiguous beam-shaping optics and split beam-shaping optics, respectively.

FIGS. 12A–12C show beam shapers that are a single-DOE embodiment, a double-DOE embodiment, and a n-DOE embodiment, respectively.

DETAILED DESCRIPTION OF THE INVENTION

Figure 1:
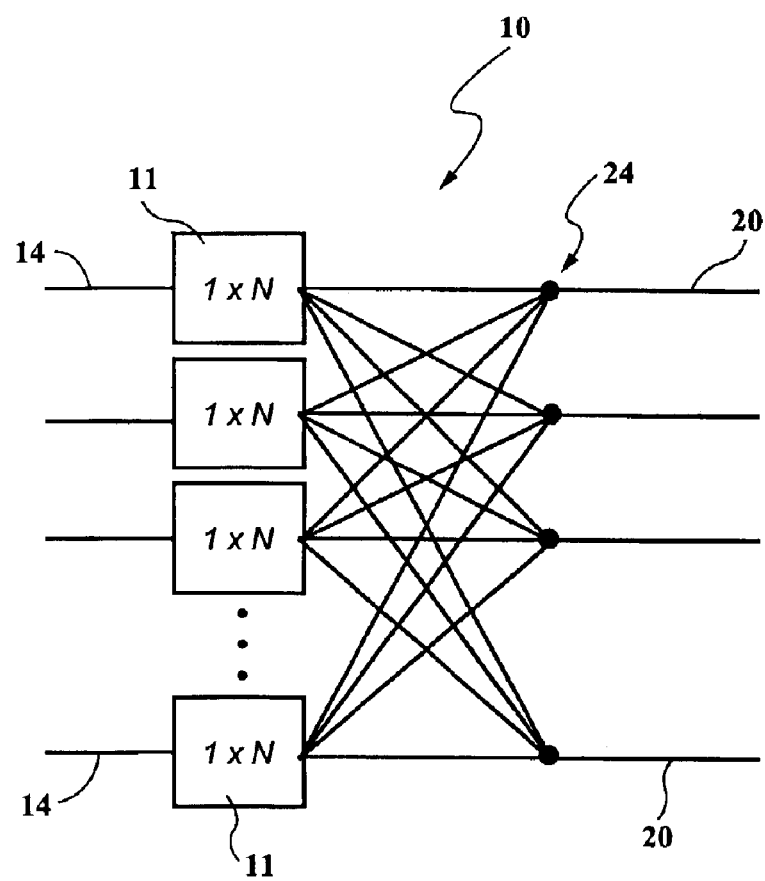
FIG. 1 is a schematic representation of M (1×N)-switches ganged together to make an (M×N) optical switch.
Figure 2:
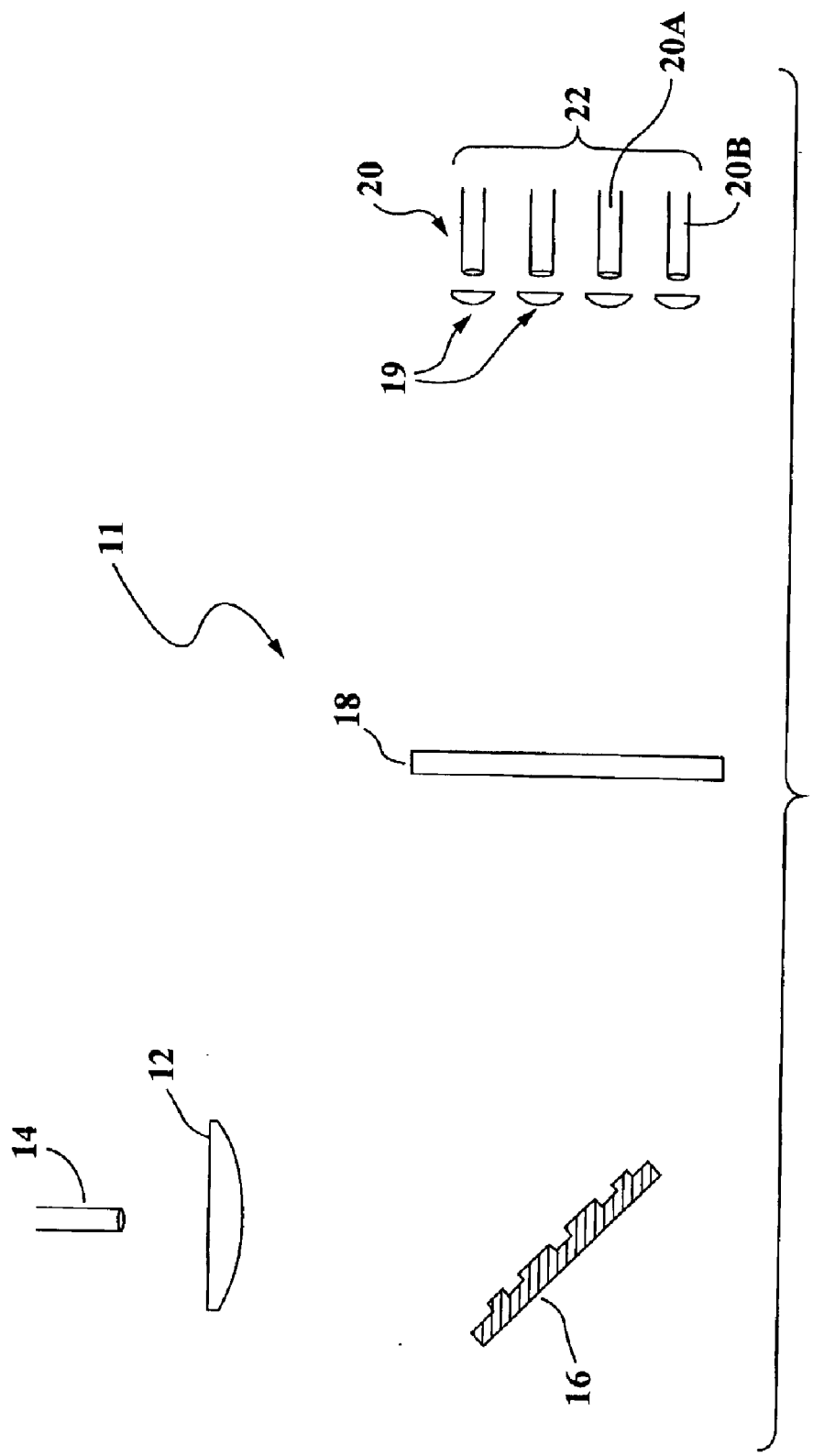
FIG. 2 is a layout of a (1×N)-switch using a reflective spatial light modulator (SLM) and a single diffractive optical element (DOE).

The present invention is directed to optical cross-connect switches. An (M×N) optical switch 10 according to the present invention can be formed by ganging M (1×N)-switches 11 together, as depicted in FIG. 1. These switches 11 can be connected using optical fibers 20 and combiners 24. One embodiment for a (1×N) switch 11 is depicted in FIG. 2, where light (not shown) from fiber 14 is collimated by lens 12 and impinges on a reflective spatial light modulator (SLM) 16. Upon reflection, the light passes through a diffractive optical element (DOE) 18 and is focused on the desired output coupling lens 19. Each lens 19, which is preferably either a micro-lens or a GRIN lens, then further focuses the light into the end of the selected output fiber 20. The output coupling lens 19 and output fiber 20 are members of an output array 22 of N lens/fiber pairs. Depending on which output fiber is "selected", the SLM 16 assumes a configuration that imposes a unique wavefront shape on the reflected light. The DOE 18 then transforms each of these different wavefronts such that the output is focused onto the appropriate output coupling lens 19 and fiber 20. For some configurations of SLM 16, the light can be focused on multiple pairs of lens 19/fibers 20. For instance, if one SLM configuration focuses light on output fiber 20A and another configuration focuses light on fiber 20B, then a linear combination of these two configurations will focus light on both fibers 20A and 20B simultaneously.

Figure 3:
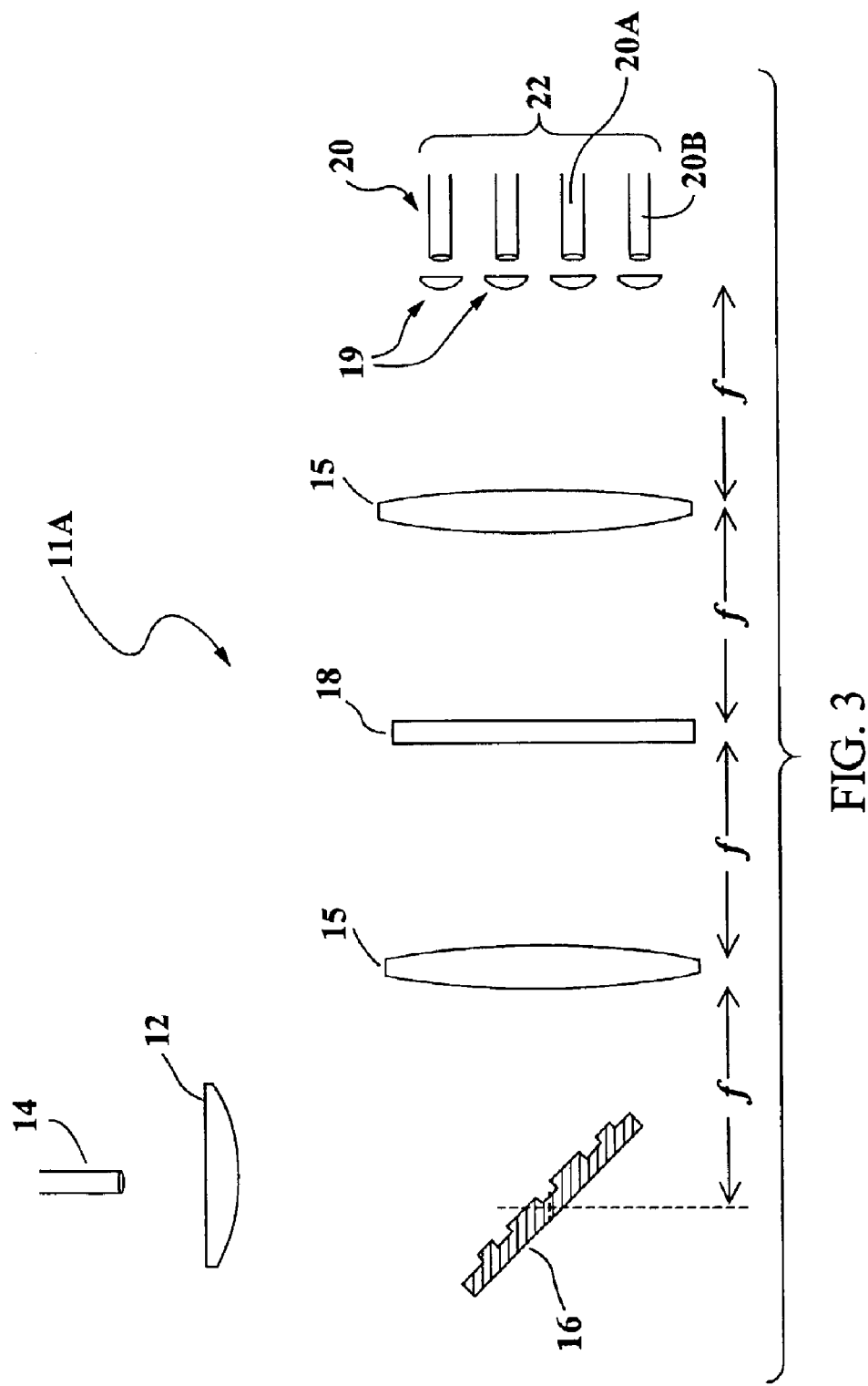
FIG. 3 is a layout of a (1×N)-switch using a reflective SLM, a single DOE, and coupling lenses.

Another embodiment of a (1×N)switch 11A is shown in FIG. 3. Switch 11A uses coupling lenses 15 between SLM 16 and DOE 18 and between DOE 18 and the output fiber array 22. The spacing between the coupling lenses 15 and the other optical elements is set at the focal length of the lens 15. In this embodiment, the light impinging on the DOE 18 is the Fraunhofer diffraction pattern of the SLM mirror array 16, and the light impinging on the output fiber array is the Fraunhofer pattern of DOE 18's output. This arrangement greatly simplifies design at the expense of adding more lenses.

Figure 4:
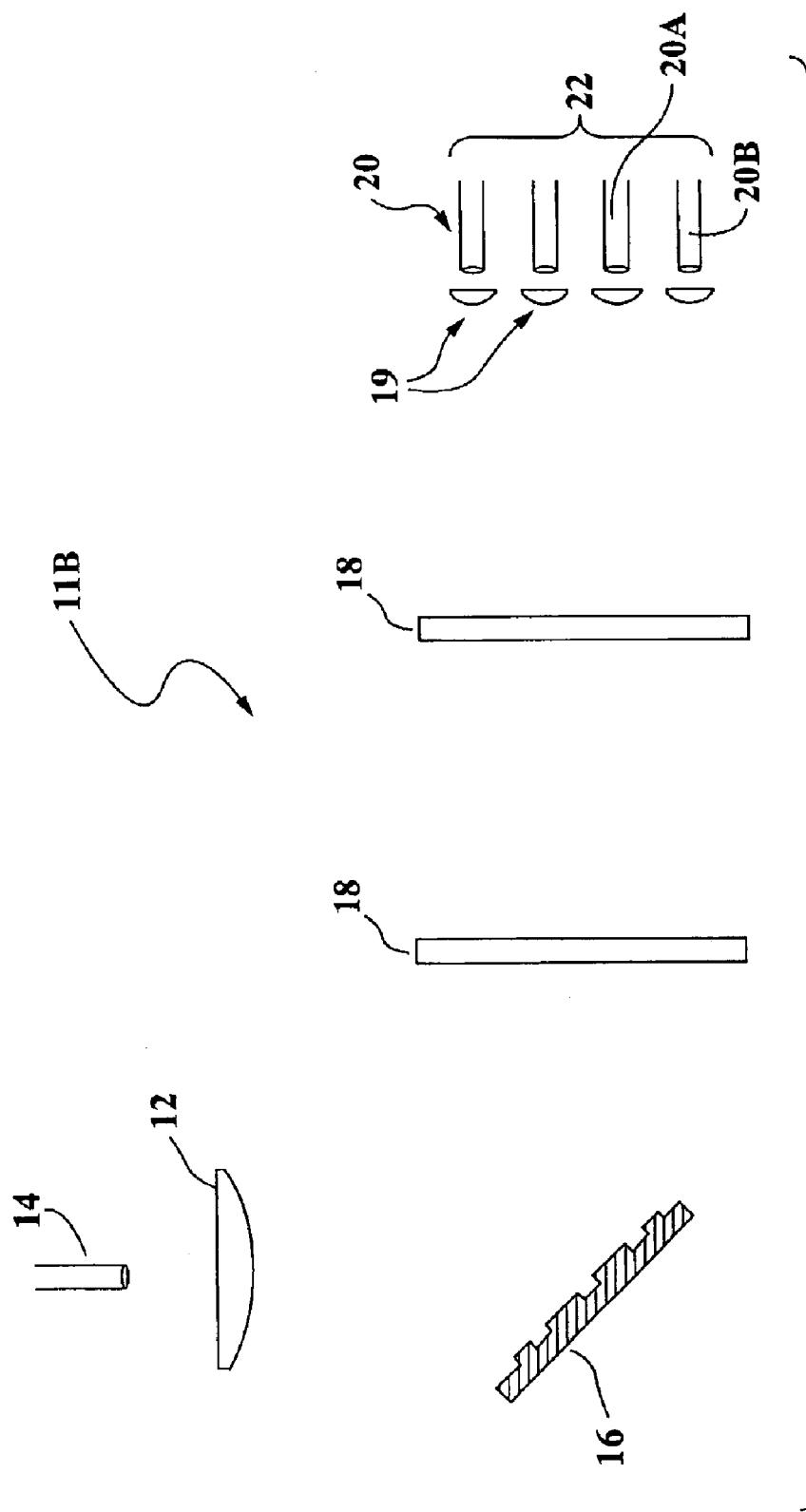
FIG. 4 is a layout of a (1×N)-switch using a reflective SLM and multiple DOEs.

Yet another embodiment of a (1×N)switch 11B is shown in FIG. 4. Switch 11B uses two or more DOEs 18 separated by free-space. At the expense of adding more DOEs 18, this alternative embodiment has the advantage of allowing even more flexibility in the optical transfer function that can be realized in the beam-shaping system element.

Figure 5:
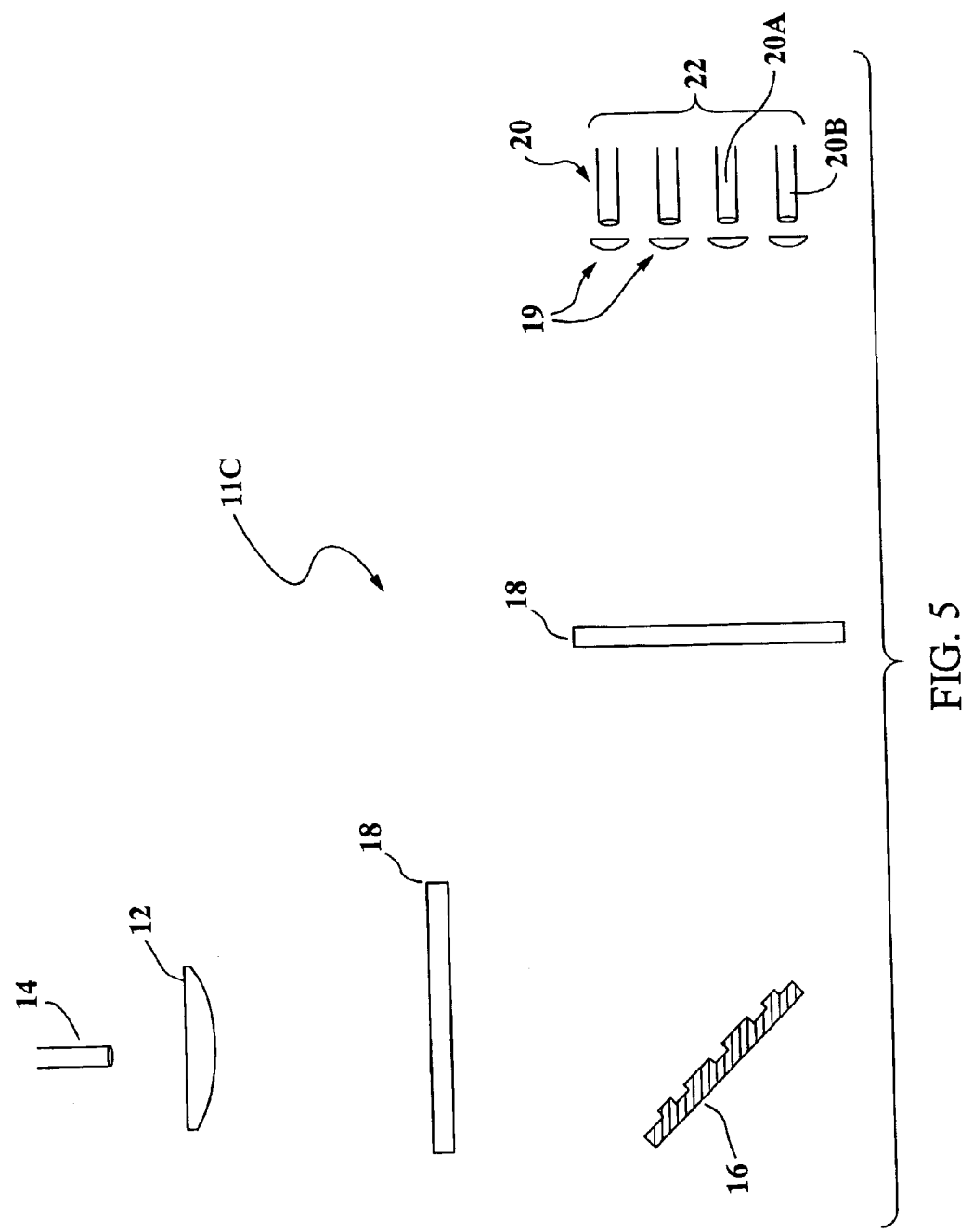
FIG. 5 is a layout of a (1×N)-switch using a reflective SLM and multiple DOEs, with one DOE preceding the SLM.

Another embodiment of a (1×N)switch 11C is shown in FIG. 5. Here, a second DOE 18 is placed before SLM 16 in addition to the first DOE 18 placed after SLM 16.

Figure 6:
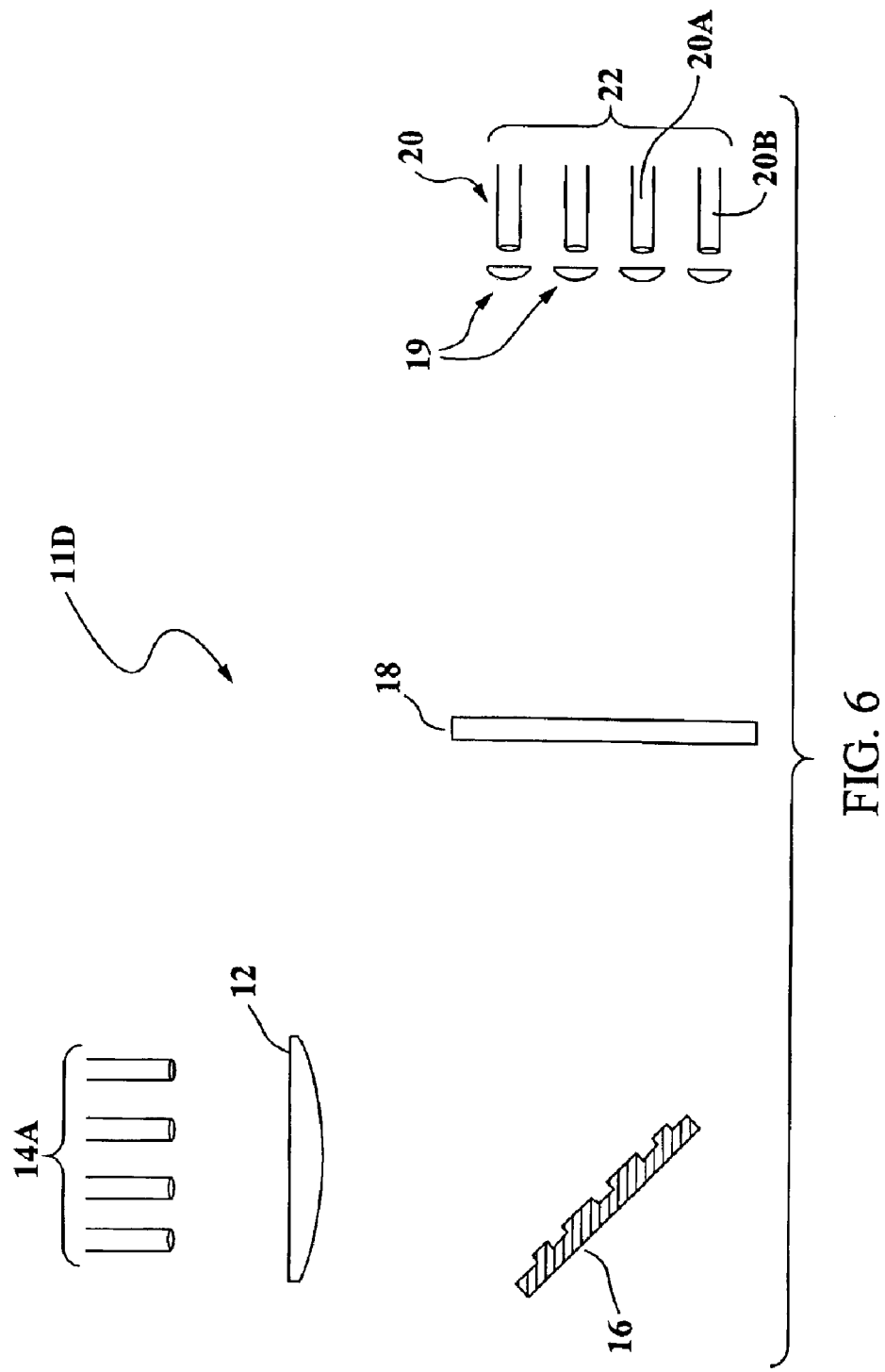
FIG. 6 is a layout of an (M×N)-switch using a reflective spatial light modulator (SUM) and a single diffractive optical element (DOE).

In the embodiment of a (1×N)switch 11D depicted in FIG. 6, light from an array of M input fibers 14a is directed onto SLM 16 through lens 12. This configuration allows the direct realization of an (M×N) switch, without having to gang M (1×N)-switches together, as depicted in the embodiment shown in FIG. 1. However, this simplification comes at the cost of requiring more pixels in SLM 16 and DOE 18.

Figure 7:
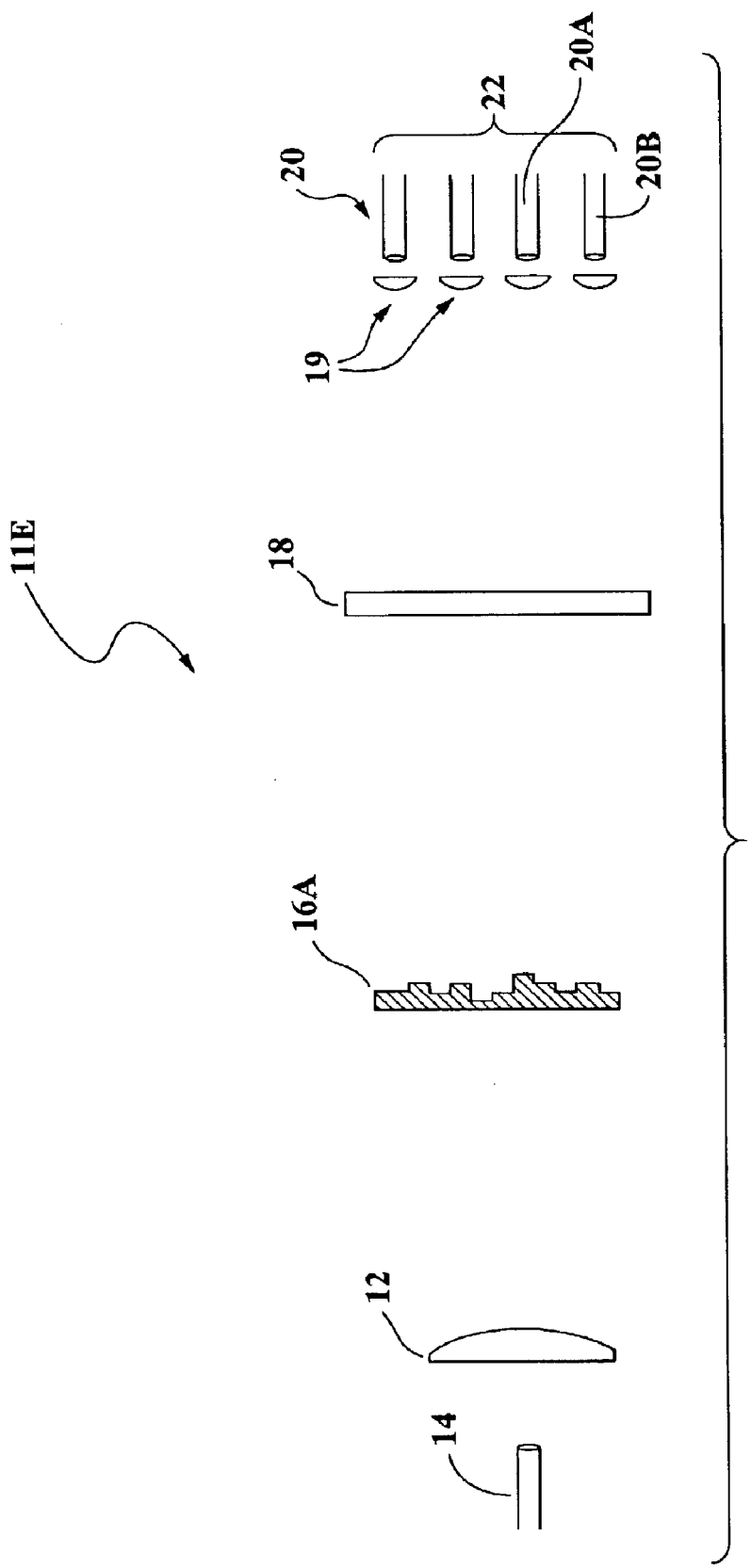
FIG. 7 is a layout of a (1×N)-switch using a transparent spatial light modulator (SLM) and a single diffractive optical element (DOE).

In each of the embodiments shown in FIGS. 1–6, coupling lenses can be used between each of the optical elements to simplify design at the expense of having more lenses. In each of these same embodiments, any spatial light modulator capable of altering the phase of an impinging light wavefront can also be used. This includes, but is not limited to, micro-mirror arrays, liquid crystal SLMs and electro-optic SLMs. The SLM does not need to provide high-resolution control of the wavefront's phase. In particular, the SLM needs only to generate a ±½π relative phase-shift. This attribute is especially useful if a micro-mirror array is used as the SLM. The SLM can be reflective, as depicted in FIGS. 2–6, or it can be transparent, as depicted for the (1×N)switch 11E shown in FIG. 7.

Figure 8:
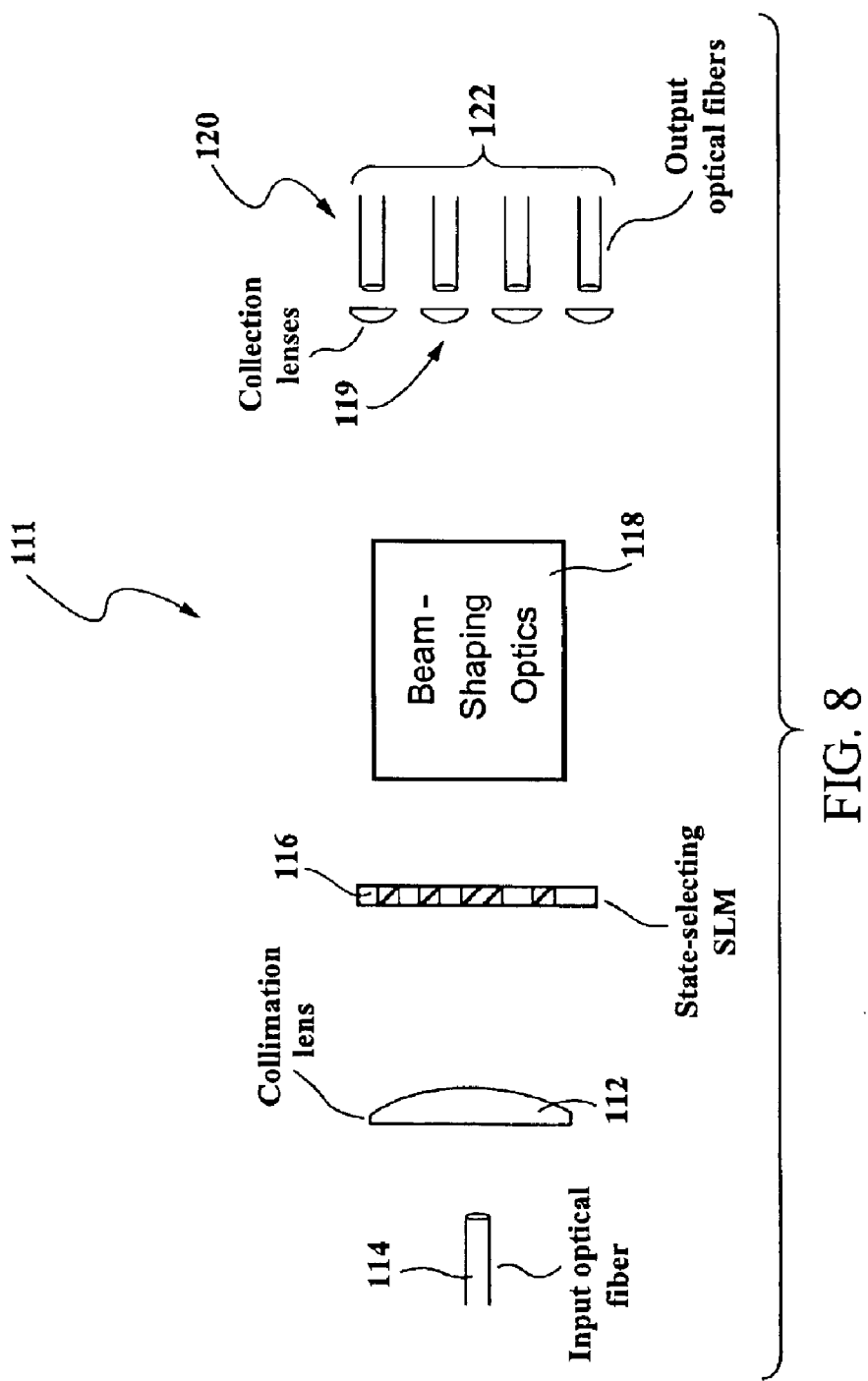
FIG. 8 is a schematic of a representative (1×K)-switch element.
Figure 9B:
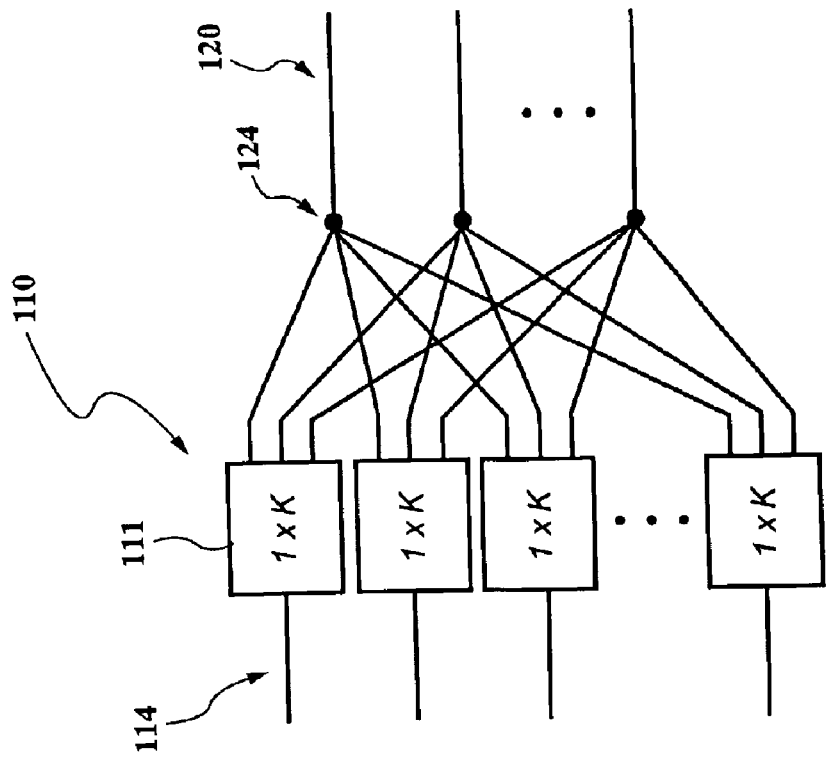
FIGS. 9A and 9B show switch topologies for direct implantation and ganged (1×K)-switch elements, respectively.
Figure 9A:
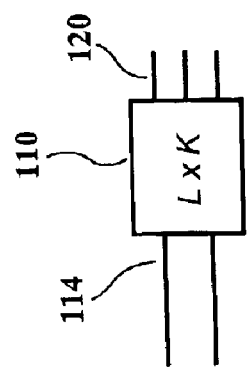

One embodiment of an (L×K) optical switch 110 according to the present invention is shown in FIG. 9A. For this embodiment, L (1×K)-switch elements 111 are ganged together, as depicted in FIG. 9B. The switches 111 are connected together using optical fibers 120 and fiber optic combiners 124. One embodiment for a (1×K)-switch element 110 is shown in FIG. 8. Switch element 110 consists of a lens 112 that collimates light from a single input optical fiber 114 so that a plane wave (not shown) is incident on a spatial light modulator (SLM) 116, such as a micromirror array. This SLM 116 imposes a non-uniform complex wave-amplitude profile on the wave. This profile can be very irregular, because the subsequent beam shaping optics 118 transform this wave into one that focuses on to a desired one of a plurality of output optical fibers 120 through a plurality of output coupling lens 119. Each lens 119, which is preferably either a micro-lens or a GRIN lens, further focuses the light into the end of the selected output fiber 120. The SLM 116 can be set to produce any one of K different complex wave-amplitude (or "wavefront") profiles, and the beam shaping optics 118 transform each of these input profiles into a wave that converges onto a different output fiber 120 through a corresponding lens 119.

Another embodiment for the (1×K) switch element 111A is depicted in FIG. 10A, where light from fiber 114 is collimated by lens 112 and impinges on a state selector 116. Upon exiting the state selector 116, the light wave propagates through free-space 117 to a beam shaper 118. The light wave exiting from state selector 116 is not necessarily collimated, nor would it necessarily converge on the appropriate output fiber 120. The beam shaping optics 118 transform the wavefront incident on its input plane into one that converges on the collection lens 119 for the appropriate output optical fiber 120. To switch the light to a different output fiber, state selector 116 changes configuration, altering the complex wave-amplitude of the light wave exiting it. In turn, the beam shaper 118 transforms this different "wavefront" into one that converges on a different output fiber/lens pair 119/120. The beam shaper 118 is a fixed optical system.

Figure 11B:
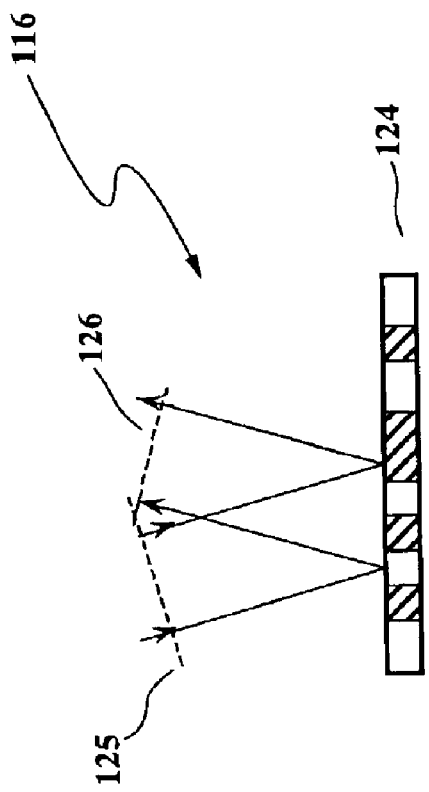
FIGS. 11A and 11B show state selectors that are a transparent SLM and a reflective SLM, respectively.
Figure 11A:
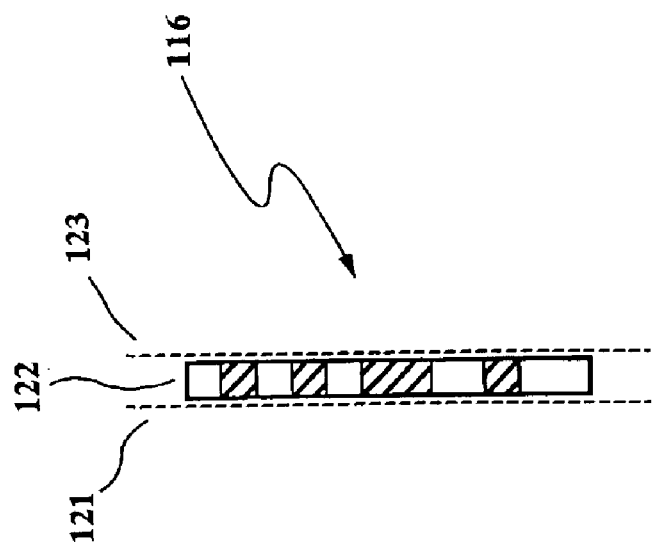

An embodiment of state selector 116 is a simple transparent spatial light modulator (SLM) 122, shown in FIG. 11A. The input plane 121 and output plane 123 of state selector 116 is, therefore, simply the front and back surfaces of the SLM 122.

An alternative embodiment of the state selector 116 is a reflective SLM 124 shown in FIG. 11B. Surfaces 125 and 126 are the input and output planes, respectively of reflective SLM 124.

A principal cost and manufacturing hurdle to any optical switch is its dynamic element(s). Accordingly, a central objective of the switch architecture of the present invention is to allow flexibility in the selection of the SLM, including the use of a very basic SLM. The basic SLM produces piecewise constant amplitude-phase profiles when illuminated by a plane wave. Each SLM element produces a constant amplitude-attenuation and phase-shift across its face. For the SLM to be as simple as possible, it should have as few of these elements as possible. However, for all K of these piecewise constant profiles to be linearly independent, the SLM must have at least K elements.

The SLM can be further simplified if each element takes on as few states as possible. Ideally, only two states per element would be desirable for the SLM. In the case of a micromirror array SLM, the control problem for each mirror would be greatly simplified. When only two states are required, the two positions of each micromirror can be set by mechanical stops, obviating the need for active electronic control.

The overall optical switch should also be low loss. This implies that the SLM should not absorb any light, and therefore, the SLM should impose a phase-only profile. In sum, for the simplest lossless SLM, the wavefront profiles it produces must:

(i) be linearly independent;
(ii) consist of K piecewise constant segments of equal size; and
(iii) satisfy $|u_t(x,y)|=1$.

There is an orthonormal set of functions that have these properties: the 2D Hadamard functions $$\{had_{mn}(x,y)\}_{mn,=0}^{\infty}.$$

These functions are also called Walsh functions. The function $had_{mn}(x,y)$ can be built up from a tiling of $2^p \times 2^q$ rectangular segments of equal size and with constant values ±1, if $m \leq 2^p$ and $n \leq 2^q$, where p,q=1, 2, 3 . . .

Consequently, the SLM should be capable of generating ±½π phase-shifts without any absorption and have M×N elements (where $MN \geq K$, $M=2^p$, $N=2^q$, and p,q=1, 2, 3 . . . ). Between the two embodiments for the state selector 116 depicted in FIGS. 10A and 10B, any phase-only SLM will work, including micromirror arrays, liquid crystal SLMs and electro-optic SLMs. Any of these embodiments for state selector 116 will produce at its exit a complex wave-amplitude from the set $\{had_{mn}(x,y)|m=1, 2, \ldots M-1, n=1,2, \ldots N-1\}$.

Beam shaper 118 then converts this wave into one that converges on the output fiber 120 at position (m,n). Moreover, the same fixed optical train needs to do this for all m=0,1, . . . M−1 and n=0,1, . . . N−1. There are a number of standard coherent optical processing techniques that can be adapted to perform this function. By and large, these techniques are implemented by a train of lenses and diffractive optical elements (DOE) (sometimes also called computer generated holograms (CGH), holographic masks or holographic elements). Consequently, the beam shaper 118 is laid out as depicted in FIGS. 12A–12C. The embodiment in FIG. 12C, beam shaper 118C, consists of an optional input coupling lens 201 followed by a first DOE 202, an optional coupling lens 203, a second DOE 204, another optional coupling lens 205, etc. up to a $P^{th}$ DOE 206 and, lastly, an optional output coupling lens 207. The embodiments in FIGS. 12A and 12B of beam shapers 118A and 118B, respectively, are special cases containing exactly one or two DOEs, respectively. The coupling lenses between DOEs (e.g., 202,204) are Fourier transforming lenses. Therefore, the preceding and succeeding DOEs are located in the front and back focal planes of each lens. These lenses can greatly simplify design at the expense of adding more lenses. The input coupling lens 201 and the output coupling lens 207 can be either Fourier transforming or imaging lenses.

In general, these diffractive optical elements can have a complex transfer function. However, practical DOEs usually have either a pure-amplitude (i.e., real) or a pure-phase transfer function. Nevertheless, these simpler DOEs can be arranged to have an effective complex transfer function by utilizing any one of a number of standard "encoding" techniques. Amplitude-only masks are generally inefficient, which is detrimental to the present switch application where as little loss as possible is desirable. On the other hand, systems employing phase-only masks, often called "kinoforms", can theoretically have up to 100% efficiency, since the mask's complex transfer function (CTF) satisfies $|h(x,y)|=1$, and is absorptionless by definition.

Therefore, phase-only DOEs can be used in the present invention, and they are available in several varieties. The preferred type is the surface-relief DOE which, in turn, $$v(x, y) = \int \cdots \int G_P(x, y | x_P, y_P) H_P(x_P, y_P) G_{P-1}(x_P, y_P | x_{P-1}, y_{P-1}) \cdots H_1(x_1, y_1) \times \quad (5)$$
$$G_0(x_1, y_1 | x', y') u(x', y') dx' dy' dx_1 dy_1 \cdots dx_P dy_P$$

comes in two varieties: the continuous (or "analog") relief DOE and the multilevel (or "binary optics") DOE. Surface-relief DOEs are fabricated by any one of several microlithographic techniques, and they can be custom manufactured by companies such as MEMS Optical of Huntsville, Ala. or Wavefront Sciences of Albuquerque, N. Mex.

In an embodiment of the present invention, a system capable of performing a general spectral analysis (i.e., a general "optical integral transform") is adapted to function as the beam shaper 118. In a traditional general spectral analyzer, the complex wave-amplitude incident on its input plane is expanded in a generalized Fourier series of some desired set of orthonormal basis functions, $$u(x, y) = \sum_{m,n=0}^{\infty} u_{mn} \psi_{mn}(x, y), \quad (4)$$

and light intensities proportional to $u_{mn}$ are focused onto K photodiodes arrayed in the analyzer's output plane. This way, the first K Fourier coefficients are measured. Such a device can be adapted to function as the beam-shaping subsystem 118 needed for the optical switch 110. In this embodiment, the basis functions are chosen to be 2D Hadamard functions, the output of the state selector 116 is imaged onto the analyzer's input plane, and the photodetectors are replaced by the collection lens/output fiber pairs 119 and 120. Then, when the state selector 116 is set to produce $had_{pq}(x,y)$, for example, all of the light will be directed to the collection lens/output fiber pair 119 and 120 sitting at the location for $u_{pq}$.

Several implementations of a Hadamard spectral analyzer, or "optical Walsh-Hadamard transform", have been previously developed. A methodology for designing systems that perform general optical transforms has also been developed by Gu, et al. See B. Gu, G. Yang, and B. Dong, Appl. Opt., 25, 3197 (1986). The entire contents of the article by Gu, et al. is hereby incorporated by reference in this application. These systems consist of a train of diffractive optical elements, and this method works for an arbitrary number of DOEs with or without coupling lenses. Thus, these systems of Gu, et al. are applicable to the embodiment of a beam shape depicted in FIG. 12C. For a general system composed of P diffractive optical elements, the input/output relation linking the complex wave-amplitude on the input plane to the complex amplitude on the output plane is given by the integral operator where $\upsilon(x,y)$ is the complex amplitude on the output plane, $u(x,y)$ is the complex amplitude on the input plane, $H_n(x_n y_n)$ is the complex transfer function of the $n^{th}$ DOE, and $G_n(x_m y_n | x_{n-1}, y_{n-1})$ is the propagation kernel for wave propagation from the $n^{th}$ to the $n+1^{th}$ DOE. $G_0$ is the kernel for propagation from the input plane to the $1^{st}$ DOE, and $G_P$ is the propagation kernel from the $P^{th}$ DOE to the output plane. If there is only free-space separating DOEs n and n+1, then $G_n$ is a modified Fresnel kernel $$G_n(x, y | x', y') = \frac{1}{i\lambda d_n} e^{i2\pi \frac{d_n}{\lambda}} e^{i\frac{\pi}{\lambda d_n}[(x-x')^2 + (y-y')^2]} \quad (6)$$

where $d_n$ is the distance between the DOEs, and $\lambda$ is the light wavelength. On the other hand, if a Fourier coupling lens is used, then $G_n$ is a modified Fourier kernel $$G_n(x, y | x', y') = \frac{1}{i\lambda f} e^{i4\pi \frac{f}{\lambda}} e^{-i\frac{2\pi}{\lambda f}(xx' + yy')} \quad (7)$$

where f is the focal length of the lens. Since only the intensity $|\upsilon(x,y)|^2$ on the output plane is of interest, the constant phase factors in equations (6) and (7) have no effect, and can be ignored. In practice, all optical signals are band-limited. Therefore the complex wave-amplitudes $v(x,y)$ and $\upsilon(x,y)$ can be completely represented by a suitably dense sampling in accordance with Shannon's sampling theorem. Thus the integral equation (5) is well-approximated by its discrete version:

$$v[m, n] = \sum_{|m_P| \leq M_P} \sum_{|n_P| \leq N_P} \cdots \sum_{|m_1| \leq M_1} \sum_{|n_1| \leq N_1} \sum_{|m| \leq M_0} \sum_{|n| \leq N_0} G_P[m, n | m_P, n_P] H_P[m_P, n_P] G_{P-1}[m_P, n_P | m_{P-1}, n_{P-1}] \cdots H_1[m_1, n_1] \times \quad (8)$$
$$G_0[m_1, n_1 | m', n'] u[m', n']$$

$$H_k[m, n] = H_k(m\Delta x_k, n\Delta y_k)$$
$$u[m, n] = u(m\Delta x_0, n\Delta y_0)$$
$$v[m, n] = v(m\Delta x, n\Delta y)$$

Where DOEs k and k+1 are separated by free-space, $$G_k[m, n | m', n'] = \exp\left[\frac{i\pi}{\lambda d_k}(m^2 \Delta x_{k+1}^2 + m'^2 \Delta x_k^2 - 2mm' \Delta x_{k+1} \Delta x_k + n^2 \Delta y_{k+1}^2 + n'^2 \Delta y_k^2 - 2nn' \Delta y_{k+1} \Delta y_k)\right] \times$$
$$\text{sinc}\left[\frac{w_k}{\lambda d_k}(m\Delta x_{k+1} - m'\Delta x_k)\right] \text{sinc}\left[\frac{w_k}{\lambda d_k}(n\Delta y_{k+1} - n'\Delta y_k)\right],$$

and where DOEs k and k+1 are coupled by a Fourier transforming lens, $$G_k[m, n \mid m', n'] = \exp\left[-i\frac{2\pi}{\lambda f}(mm'\Delta x_{k+1}\Delta x_k + nn'\Delta y_{k+1}\Delta y_k)\right]\text{sinc}\left[\frac{m\Delta x_{k+1}w_k}{\lambda f}\right]\text{sinc}\left[\frac{n\Delta y_{k+1}w_k}{\lambda f}\right],$$

$(x_k, y_k)$ is the sample spacing (in the x- and y-directions) used at the $k^{th}$ DOE, $(x_0, y_0)$ is the sample spacing used at the input plane, $(x, y)$ is the sample spacing used at the output plane, $w_k$ is the aperture width of the $k^{th}$ DOE, and $w_0$ is the input aperture width. Because the DOEs and input have finite apertures, $H_k[m,n]=0$ for all $|m|>M_k$, $|n|>N_k$ and $u[m,n]=0$ for all $|m|>M_0$, $|n|>N_0$. Therefore, the sums in equation (8) are finite, and (8) represents a finite set of simultaneous equations. Gu, et. al. disclose an iterative algorithm for solving (8) for $H_k[m,n]$, which specify the CTFs for the diffractive optical elements.

Chen, et al. have used Gu, et al.'s technique to design and construct a system for performing an optical Walsh-Hadamard transform capable of generating the generalized Fourier coefficients corresponding to the first 1024 2D Hadamard functions, $$\{had_{mn}(x, y)\}_{m,n=0}^{31}.$$

See Y Chen, S. Zheng, D. Li, and G. Yang, Chin. Phys. Lett., 7, 437 (1990); G. Yang, Y. Chen, S. Zheng, B. Dong, and D. Li, "A Coherent System for Performing an Optical Transform" in *Proceedings of the Twenty-Second Annual Hawaii International Conference on System Sciences*, v. 1, pp.445–449, IEEE Comput. Soc. Press, Washington, D.C., 1990; Y. Chen, S. Zheng, B. Dong, D. Li, and G. Yang, Appl. Opt., 27, 2608 (1988). The entire contents of the Chen, et al. articles is hereby incorporated by reference in this application. The spectral analyzer in this system consists of a single DOE plus two Fourier coupling lenses that couple this element to the input and output planes. Therefore when incorporated into the optical switch architecture of the present invention, the embodiment for the beam shaper 118 will be beam shaper 118A shown in FIG. 12A and will work for a 1×1024 switch element 10 (M=N=32). Both the input coupling lens 201 and the output coupling lens 207 are Fourier transforming lenses. For use in the switch of the present invention, the DOE is instead implemented by phase-encoding the CTF into a kinoform, as discussed earlier.

An alternative optical Walsh-Hadamard transform system previously developed is composed of a random phase mask at the input plane followed, in sequence, by a Fourier coupling lens, a second DOE, and a second Fourier coupling lens to the output plane. See J. R. Leeger and S. H. Lee, Opt. Eng., 18, 518 (1979). The entire contents of the Leeger and Lee article is hereby incorporated by reference in this application. The CTF of the first mask is $$H_1(x,y) = e^{i\phi_R(x,y)} \quad (9)$$

where $\phi_R(x,y)$ is a random, but fixed and known, function ranging from 0 to $2\pi$. The second DOE has a CTF $$H_2(x, y) = \hat{h}_2\left(\frac{x}{\lambda f}, \frac{y}{\lambda f}\right) \quad (10)$$

where f is the focal length of the coupling lenses and $\hat{h}_2$ is the Fourier transform of $h_2(x,y)$. In turn, $$h_2(x, y) = \sum_{m,n=0}^{N-1} had_{mn}(-x-ma, -y-na)e^{-i\phi_R(-x-ma,-y-na)} \quad (11)$$

where a is the spacing between photodetectors in the output plane. In the switch of the present invention, this is the spacing of the output fibers. The output of the system is then $$v(x,y) = h_2(x,y) \otimes u(x,y)e^{i\phi_R(x,y)} \quad (12)$$

where $\otimes$ is the correlation operator. In this alternative transform system, M=N=8. Using this system in the switch of the present invention results in a 1×64 switch element 10, and the beam shaper 118 is the embodiment of 118B shown in FIG. 12B with the addition an input coupling lens 201 that images the exit plane 123 of the state selector 116 onto the random phase DOE 202. Alternatively, the optional input coupling lens 201 can be eliminated if the random phase DOE 202 is placed in the exit plane 123 of the state selector 116. The output coupling lens 207 would be a Fourier transforming lens. Here again, the switch of the present invention requires that the $H_1$ and $H_2$ CTFs be implemented as phase-encoded kinoforms instead.

The beam shaper of the present invention can also be implemented using a "modan". There are several types of modans, and one variety developed by Soifer and Golub is a DOE that, upon illumination by a plane wave, generates a superposition of free-space modes propagating in different directions. See V. Soifer and M. Golub, *Laser beam Mode selection by Computer Generated Holograms*, CRC Press, Boca Raton, Fla., 1994. The entire contents of the Soifer and Golub article is hereby incorporated by reference in this application. The complex transfer function of such an optical element is:

$$T(x, y) = \sum_{n=1}^{N}\sum_{m=1}^{M} A_{mn}\psi_{mn}(x, y)e^{i(\alpha_{mn}x+\beta_{mn}y)} \quad (13)$$

where $\psi_{mn}(x,y)$ is the complex amplitude of mode (m,n) evaluated at the exit plane of the modan, $|A_{mn}|$ gives its relative weight, and $(\alpha_{mn},\beta_{mn})$ specifies the angle of propagation. Assuming that such a device is illuminated by complex amplitude $\psi_{pq}(x,y)$ instead of a plane wave, and that the modan is followed by a Fourier transforming lens, then an auto-correlation peak for $\psi_{pq}$ would occur in the lens' focal plane at position $$(x, y) = \left(\frac{\lambda f}{2\pi}\alpha_{mn}, \frac{\lambda f}{2\pi}\beta_{mn}\right)$$

and with peak intensity $|A_{pq}|^2$, where f is the focal length of the lens. This arrangement is equivalent to an optical pattern recognition system based on multiplexed matched spatial filters.

Where a modan is used as the beam shaper 118 for a 1×K switch element 10, 2D Hadamard functions are used as the basis modes: $\psi_{mn}=had_{mn}(x,y)$. These modes are given equal weight, $A_{mn}=1$, and the complex transfer function is $$T(x, y) = \sum_{n=1}^{N}\sum_{m=1}^{M} had_{mn}(x, y)e^{i(\alpha_{mn}x+\beta_{mn}y)} \quad (14)$$

A modan with this CTF is used for the DOE 202 in the beam shaper embodiment depicted in FIG. 12A. The input coupling lens 201 images the exit plane 123 of the state selector 116 on to the modan 202. Therefore, the complex-amplitude incident on the modan is a 2D Hadamard function. The output coupling lens 207 is a Fourier transforming lens. As discussed in the previous paragraph, the action of the modan 202 plus the succeeding Fourier transforming lens 207 is to create an autocorrelation intensity peak in the output coupling lens' focal plane 208 (FIG. 12A). If the state selector 116 is set to produce complex amplitude had$_{pq}$(x,y), then in the focal plane 208, the light is concentrated around position $$(x, y) = \left(\frac{\lambda f}{2\pi}\alpha_{mn}, \frac{\lambda f}{2\pi}\beta_{mn}\right),$$

where a collection lens 19 and output fiber 20 are placed. The collection lens 19 acts to couple the light to the output fiber 20. Other lens/fiber pairs are placed at locations $$\left(\frac{\lambda f}{2\pi}\alpha_{mn}, \frac{\lambda f}{2\pi}\beta_{mn}\right),$$

m=1,2, ... M n=1,2, ... N in the focal plane. Light is directed to the fiber at position $$\left(\frac{\lambda f}{2\pi}\alpha_{mn}, \frac{\lambda f}{2\pi}\beta_{mn}\right)$$

simply by setting the SLM to produce complex amplitude had$_{mn}$(x,y). To realize a DOE with CTF shown in equation (14), the DOE should be phase-only to maximize efficiency. On the other hand, CTF (14) is an amplitude-phase profile, so this CTF must be phase-encoded by any one of several methods. One method starts by recognizing that the phase of each term has no effect on the intensity profile in the focal plane 208. Since only the intensity in the focal plane is of interest, a modan with CTF $$T(x, y) = \sum_{n=1}^{N}\sum_{m=1}^{M} e^{i\xi_{mn}} had_{mn}(x, y) e^{i(\alpha_{mn}x+\beta_{mn}y)} \quad (15)$$

can be used. Therefore, $\xi_{mn}$ can be manipulated as free parameters in equation (15), such that T(x,y) becomes phase-only. In other words, $\xi_{mn}$ and $\phi$(x,y) must be found, such that $$T(x, y) = e^{i\phi(x,y)} = \sum_{n=1}^{N}\sum_{m=1}^{M} e^{i\xi_{mn}} had_{mn}(x, y) e^{i(\alpha_{mn}x+\beta_{mn}y)} \quad (16)$$

An approximate solution to this problem can be found if $\alpha_m$ and $\beta_n$ are chosen large enough, such that the overlap integrals $$I_{mn,pq} = \int\int had_{mn}(x, y) had_{pq}(x, y) e^{i[(\alpha_{mn}-\alpha_{pq})x+(\beta_{mn}-\beta_{pq})y]} dxdy \quad (17)$$

are small. In this case, the functions had$_{mn}$(x,y) $e^{i(\alpha_{mn}x+\beta_{mn}y)}$ are approximately orthogonal, and equation (16) can be decomposed into the simultaneous equations $$\left.\begin{array}{l} e^{i\xi_{mn}} = \int\int e^{i\phi(x,y)} had_{mn}(x, y) e^{-i(\alpha_{mn}x+\beta_{mn}y)} dxdy \\ e^{i\phi(x,y)} = \sum_{n=1}^{N}\sum_{m=1}^{M} e^{i\xi_{mn}} had_{mn}(x, y) e^{i(\alpha_{mn}x+\beta_{mn}y)} \end{array}\right\} \begin{array}{l} m = 0,1,\ldots M-1 \\ n = 0,1,\ldots N-1 \end{array} \quad (18)$$

In turn, these equations can be solved iteratively by a Gerchberg-Saxton type algorithm.

Kohina, et al. describe a modan designed by this method, whose basis set is the lowest 25 2D-Hadamard functions, $$\{had_{mn}(x, y)\}_{mn=0}^{4}.$$

See S. N. Kohina, V. V. Kotylar, R. V. Skidanov and V. A. Soifer, "Optical Data Processing Using DOEs" in *Methods for Computer Design of Diffractive Optical Elements*, V. A. Soifer, ed., John Wiley & Sons, New York, 2002. The entire contents of the Kohina et al. article is hereby incorporated by reference in this application. When followed by a Fourier transforming lens for the purposes of performing an optical Walsh-Hadamard transform, 80% of the incident light falls in the autocorrelation peaks in the focal plane. Therefore this same modan can be used in the optical arrangement of FIG. 12A to make a beam shaper 118 for a 1×25 switch element 10 (M=N=5) with about 1 dB of loss.

An alternative embodiment, 111B, for implementing a (1×K)-switching element is depicted in FIG. 10B. In this embodiment, the beam shaping optics 116 are divided, with part of the optical train preceding the state selector 118 and part succeeding it.

Figure 13:
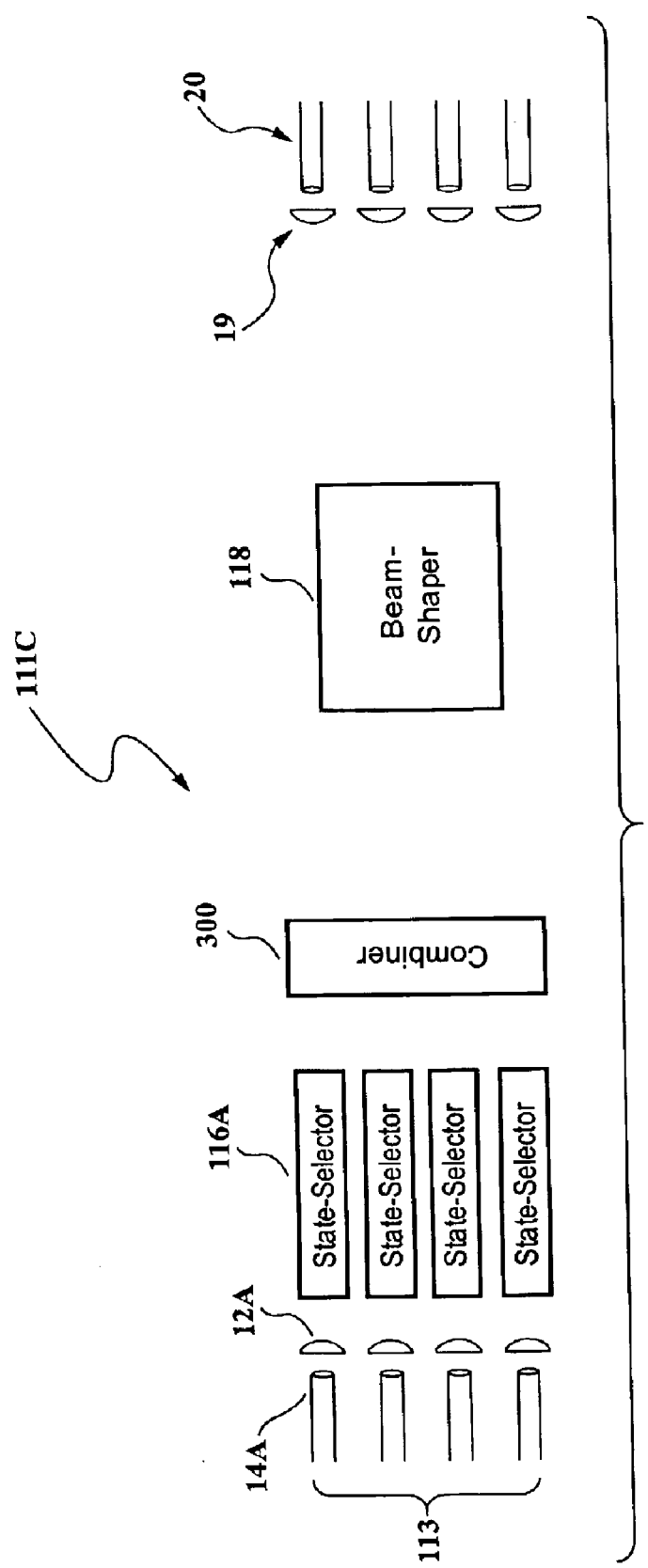
FIG. 13 shows a direct implementation of an (L×K) switch using spatial frequency multiplexed inputs.

An embodiment 111C for implementing an (L×K)-switch (FIG. 9A) directly is depicted in FIG. 13. Light from each fiber 114A in an array of L input fibers 115 is collimated by its own micro-lens or GRIN lens 112A and directed onto its own the state selector 116A. Each state selector 116A imposes on its outgoing wavefront the same phase-only wave-amplitude profiles as before. The L state selectors 116A can either be individual units, or they can be integrated into a single unit, where different portions of a large SLM are used to spatially modulate the wavefronts from each input fiber. The output of all the state selectors 116A then enters a combiner 300 that projects the exit plane of each state selector 116A into the input aperture of the beam shaper 118. The combiner is an adaptation of DOEs that have been designed for implementing free-space optical interconnects for computer systems. Beam shaper 118 can use any of the previously-described DOEs. In the embodiment of FIG. 13, the wave-amplitude on the entrance plane of the beam shaper 118 is now the linear superposition of wave-amplitudes from each of the L state selectors:

$$u(x, y) = \sum_{l=1}^{L} u(x, y; n[l]), \quad (19)$$

where u(x,y;n) is the wave-amplitude generated at the input aperture of the beam shaper by a state selector when that state selector is set to direct its light to output fiber n; n[l] is the state that state selector l is set to. The beam shaper functions as before. Since it is a linear device, it performs the same transformation on each of the component wave-amplitudes u(x,y;n n[l]) in equation (19). Therefore the light from input fiber l is ultimately focused onto the collection lens/output optical fiber n[l], 119 and 120.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the appended claims.

What is claimed is:

1. An optical switch comprising:
    a first plurality of optical input fibers,
    a second plurality of optical output fibers, and
    a plurality of switch elements, each switch element comprising:
        a state selector,
        a lens for collimating light from a single one of said optical input fibers, whereby a plane wave of said collimated light is caused to be incident on said state selector,
        a plurality of output coupling lens, each output coupling lens corresponding to one of said optical output fibers, and
        a beam shaper for focusing light emanating from said state selector on to a selected one of said output coupling lenses, whereby said selected output coupling lens further focuses the light into the end of the optical output fiber corresponding to said selected output coupling lens.

2. The optical switch according to claim 1 wherein the plurality optical output fibers are connected together by a plurality of fiber optic combiners.

3. The optical switch according to claim 1 wherein the state selector is a spatial light modulator.

4. The optical switch according to claim 3 wherein the spatial light modulator is a micro-mirror array.

5. The optical switch according to claim 3 wherein the spatial light modulator is based on liquid crystals.

6. The optical switch according to claim 3 wherein the spatial light modulator is based on an electro-optic effect.

7. The optical switch according to claim 3 wherein the spatial light modulator is a tiled micro mirror array containing a plurality of mirrors wherein each mirror is movable to a plurality of discrete positions.

8. The optical switch according to claim 3 wherein the spatial light modulator is a MEMS micro-mirror array.

9. The optical switch according to claim 1 wherein each switch element transfers light from a corresponding single optical input fiber to a selected one of said optical output fibers.

10. The optical switch according to claim 1 wherein the state selector is a spatial light modulator that imposes a non-uniform complex wave-amplitude profile on the plane wave of light incident on said state selector, and wherein the beam shaper focuses the non-uniform complex wave-amplitude profile of light emanating from said state selector on to the selected one of said output coupling lenses, the complex wave-amplitude profile determining the selected output coupling lens.

11. The optical switch according to claim 1 wherein the beam shaper is comprised of at least one diffractive optical element.

12. The optical switch according to claim 1 wherein the beam shaper is comprised of at least one diffractive optical element and at least one coupling lens.

13. The optical switch according to claim 1 wherein the beam shaper is comprised of at least one diffractive optical element and a plurality of coupling lenses.

14. The optical switch according to claim 1 wherein the beam shaper is comprised of a plurality of alternating diffractive optical elements and coupling lenses.

15. The optical switch according to claim 1 wherein the beam shaper is comprised of a single diffractive optical element positioned between two coupling lenses.

16. The optical switch according to claim 1 wherein the beam shaper is comprised of a plurality of diffractive optical elements and a plurality of coupling lenses, each diffractive optical element being positioned between two coupling lenses.

17. The optical switch according to claim 1 wherein the state selector is a transmissive spatial light modulator.

18. The optical switch according to claim 1 wherein the state selector is a reflective spatial light modulator.

19. The optical switch according to claim 1 wherein the beam shaper is comprised of at least one pure phase diffractive optical element.

20. The optical switch according to claim 1 wherein the beam shaper is comprised of at least one a multi-level surface relief pure phase diffractive optical element.

21. The optical switch according to claim 1 wherein the beam shaper is comprised of at least one analog (continuous) surface relief pure phase diffractive optical element.

22. An optical switch comprising:
    a first plurality of optical input fibers,
    a second plurality of optical output fibers, and
    a plurality of switch elements, each switch element comprising:
        means for imposing a non-uniform complex wave-amplitude profile on a plane wave of light incident on said imposing means,
        means for collimating light from a single one of said optical input fibers, whereby the plane wave of said collimated light is caused to be incident on said imposing means,
        means for focusing light onto various ones of said optical output fibers, and
        means for focusing the non-uniform complex wave-amplitude profile of light emanating from said imposing means onto said focusing means, whereby said focusing means further focuses the light into a selected one of said optical output fibers, the complex wave-amplitude profile determining the selected output coupling lens.

23. The optical switch according to claim 22 further comprising means for focusing said collimated light from said collimating means onto said imposing means.

24. The optical switch according to claim 22, wherein the means for focusing the profile of light is comprised of at least one diffractive optical element and a plurality of coupling lenses.

25. The optical switch according to claim 22, wherein the imposing means is selected from the group consisting of a spatial light modulator that is a micro-mirror array, a spatial light modulator based on liquid crystals, and a spatial light modulator based on an electro-optic effect.

26. The optical switch according to claim 22 wherein the plurality optical output fibers are connected together by a plurality of fiber optic combiners.

27. An optical switch comprising:
    a first plurality of optical input fibers,
    a second plurality of optical output fibers,
    a plurality of state selectors,
    a plurality of lenses for collimating light, each collimating lens collimating light from a corresponding single one of said optical input fibers, whereby a plane wave of said collimated light from said corresponding optical input fiber is caused to be incident on a corresponding one of said state selectors, a plurality of output coupling lenses, each output coupling lens corresponding to one of said optical output fibers, a beam shaper, and a combiner for projecting the exit plane of each of said state selectors into said beam shaper, said beam shaper focusing light emanating from said combiner onto a selected one of said output coupling lenses, whereby said selected output coupling lens further focuses the light onto an optical output fiber corresponding to said selected output coupling lens.

28. The optical switch according to claim 27 wherein each state selector is a spatial light modulator.

29. The optical switch according to claim 28 wherein each spatial light modulator is a micro-mirror array.

30. The optical switch according to claim 28 wherein each spatial light modulator is based on liquid crystals.

31. The optical switch according to claim 28 wherein each spatial light modulator is based on an electro-optic effect.

32. The optical switch according to claim 28 wherein the spatial light modulator is a tiled micro mirror array containing a plurality of mirrors, and wherein each mirror is movable to a plurality of discrete positions.

33. The optical switch according to claim 28 wherein the spatial light modulator is a MEMS micro-mirror array.

34. The optical switch according to claim 27 wherein each switch element transfers light from a corresponding single optical input fiber to a selected one of said optical output fibers.

35. The optical switch according to claim 27 wherein the state selector is a spatial light modulator that imposes a non-uniform complex wave-amplitude profile on the plane wave of light incident on said state selector, and wherein the beam shaper focuses the non-uniform complex wave-amplitude profile of light emanating from said state selector on to the selected one of said output coupling lenses, the complex wave-amplitude profile determining the selected output coupling lens.

36. The optical switch according to claim 27 wherein the beam shaper is comprised of at least one diffractive optical element.

37. The optical switch according to claim 27 wherein the beam shaper is comprised of at least one diffractive optical element and at least one coupling lens.

38. The optical switch according to claim 27 wherein the beam shaper is comprised of at least one diffractive optical element and a plurality of coupling lenses.

39. The optical switch according to claim 27 wherein the beam shaper is comprised of a plurality of alternating diffractive optical elements and coupling lenses.

40. The optical switch according to claim 27 wherein the beam shaper is comprised of a single diffractive optical element positioned between two coupling lenses.

41. The optical switch according to claim 27 wherein the beam shaper is comprised of a plurality of diffractive optical elements and a plurality of coupling lenses, each diffractive optical element being positioned between two coupling lenses.

42. The optical switch according to claim 27 wherein each state selector is a transmissive spatial light modulator.

43. The optical switch according to claim 27 wherein each state selector is a reflective spatial light modulator.

44. The optical switch according to claim 27 wherein the beam shaper is comprised of at least one pure phase diffractive optical element.

45. The optical switch according to claim 27 wherein the beam shaper is comprised of at least one a multi-level surface relief pure phase diffractive optical element.

46. The optical switch according to claim 27 wherein the beam shaper is comprised of at least one analog (continuous) surface relief pure phase diffractive optical element.

47. The optical switch according to claim 27 wherein the diffractive optical element is designed for implementing free-space optical interconnects.

48. An optical switch comprising:

a first plurality of optical input fibers, a second plurality of optical output fibers, at least one state selector, at least one lens for collimating light from a single one of said optical input fibers, whereby a plane save of said collimated light is caused by said at least one lens to be incident on said at least one state selector, a plurality of output coupling lenses, each output coupling lens corresponding to one of said optical output fibers, and at least one beam shaper for focusing light emanating from said at least one said state selector onto a selected one of said output coupling lenses, whereby said selected output coupling lens further focuses the light onto an optical output fiber corresponding to said selected output coupling lens, the complex wave-amplitude profile determining the selected output coupling lens.

49. The optical switch according to claim 48 wherein the switch is comprised of a plurality of state selectors, and wherein the switch is further comprised of a combiner for projecting light emanating from said state selectors into said at least one beam shaper.

50. The optical switch according to claim 48 wherein the switch is further comprised of a plurality of switch elements, and each switch element is comprised of a single state selector and a single beam shaper.

51. The optical switch according to claim 50 wherein each switch element is comprised of a plurality of beam shapers.

52. The optical switch according to claim 48 wherein said at least one state selector is a spatial light modulator.

53. The optical switch according to claim 52 wherein the spatial light modulator is a transmissive spatial light modulator.

54. The optical switch according to claim 52 where the reflective light modulator is a reflective light modulator.

55. The optical switch according to claim 48 wherein said at least one beam shaper is comprised of at least one diffractive optical element.

56. The optical switch according to claim 55 wherein the at least one beam shaper is further comprised of at least one coupling lens.

* * * * *